US012623660B2

(12) United States Patent
Paccoret et al.

(10) Patent No.: US 12,623,660 B2
(45) Date of Patent: May 12, 2026

(54) PERFORMING STATIC HEATING OF ELECTRIC MOTOR BASED ON VEHICLE INCLINATION

(71) Applicant: Atieva, Inc., Newark, CA (US)

(72) Inventors: Fabrice Anthony Paccoret, Fremont, CA (US); David Anthony Lickfold, Oakland, CA (US); Sai Rajeev Devaragudi, Fremont, CA (US); Jamie Wardlaw, Fremont, CA (US)

(73) Assignee: Atieva, Inc., Newark, CA (US)

( * ) Notice: Subject to any disclaimer, the term of this patent is extended or adjusted under 35 U.S.C. 154(b) by 0 days.

(21) Appl. No.: 18/701,471

(22) PCT Filed: Oct. 17, 2022

(86) PCT No.: PCT/US2022/078217
§ 371 (c)(1),
(2) Date: Apr. 15, 2024

(87) PCT Pub. No.: WO2023/069903
PCT Pub. Date: Apr. 27, 2023

(65) Prior Publication Data
US 2025/0229780 A1     Jul. 17, 2025

Related U.S. Application Data

(60) Provisional application No. 63/262,910, filed on Oct. 22, 2021.

(51) Int. Cl.
*B60W 30/18* (2012.01)
*B60K 1/00* (2006.01)

(52) U.S. Cl.
CPC ......... *B60W 30/18118* (2013.01); *B60K 1/00* (2013.01); *B60K 2001/008* (2013.01); *B60W 2710/105* (2013.01)

(58) Field of Classification Search
CPC ...... B60W 30/18118; B60W 2710/105; B60K 1/00; B60K 2001/008
See application file for complete search history.

(56) References Cited

U.S. PATENT DOCUMENTS

2013/0193896 A1     8/2013     Lynn et al.
2013/0226423 A1     8/2013     Baehrle-miller et al.
(Continued)

FOREIGN PATENT DOCUMENTS

CN     112977166 A     6/2021
DE     102018120677 A1     2/2019
WO     2013151903 A1     10/2013

OTHER PUBLICATIONS

International Search Report and Written Opinion for PCT Application No. PCT/US2022/078217, mailed on Jan. 17, 2023, 8 pages.
(Continued)

*Primary Examiner* — Long T Tran
*Assistant Examiner* — Charles J Brauch
(74) *Attorney, Agent, or Firm* — Brake Hughes Bellermann LLP

(57) ABSTRACT

A computer-implemented method of performing static heating of an electric motor comprises: applying a brake to a wheel of a vehicle that has an electric motor; determining an incline of the vehicle; and in response to the incline being within a first incline range, providing first current to the electric motor for static heating, the first current selected so as to not produce torque in the electric motor.

18 Claims, 5 Drawing Sheets

100

(56) References Cited

U.S. PATENT DOCUMENTS

2016/0221469 A1\*   8/2016  Cheng ...................... B60K 6/48
2017/0088007 A1\*   3/2017  Melendez ............. B60L 53/302

OTHER PUBLICATIONS

Extended European Search Report for European Application No. 22884621.8, dated Sep. 9, 2025, 12 pages.

\* cited by examiner

400

PERFORMING STATIC HEATING OF ELECTRIC MOTOR BASED ON VEHICLE INCLINATION

CROSS-REFERENCE TO RELATED APPLICATION

This application is a 35 U.S.C. § 371 National Phase Entry Application from PCT Application No. PCT/US2022/078217, filed on Oct. 17, 2022, entitled "PERFORMING STATIC HEATING OF ELECTRIC MOTOR BASED ON VEHICLE INCLINATION", and designating the U.S., which claims priority to U.S. Patent Application No. 63/262,910, filed on Oct. 22, 2021, and entitled "PERFORMING STATIC HEATING OF ELECTRIC MOTOR BASED ON VEHICLE INCLINATION," the disclosures of which are incorporated by reference herein in their entireties.

TECHNICAL FIELD

This document relates to performing static heating of an electric motor based on a vehicle inclination.

BACKGROUND

In recent years, electric vehicle (EV) technology has continued to develop, and an increasing number of people are choosing to have an EV as a personal vehicle. An EV has an onboard battery pack or other energy storage. Cells used in battery packs may be associated with a minimum temperature below which the cells cannot be charged. Also, for an optimum charging efficiency, and/or to optimize discharging, the cells may need to be at a substantially higher temperature than the minimum temperature.

SUMMARY

In a first aspect, a computer-implemented method of performing static heating of an electric motor comprises: applying a brake to a wheel of a vehicle that has an electric motor; determining an incline of the vehicle; and in response to the incline being within a first incline range, providing first current to the electric motor for static heating, the first current selected so as to not produce torque in the electric motor.

Implementations can include any or all of the following features. The first incline range extends from zero incline to a first incline value. The computer-implemented method further comprises also providing the first current to the electric motor for static heating in response to the incline being within a second incline range extending from a second incline value to at least a third incline value, the second incline value greater than the first incline value. The computer-implemented method further comprises providing second current to the electric motor for static heating in response to the incline being within a second incline range separate from the first incline range, the second current selected so as to not produce torque in the electric motor. The second incline range is greater than the first incline range. The second current is different from the first current. The brake is applied by a braking system configured to take the incline into account. The braking system is configured to apply the brake with a first clamp force up to a first incline, and to apply the brake with a second clamp force greater than the first clamp force above the first incline. The first incline is greater than the first incline range. The second incline range begins substantially at the first incline. The computer-implemented method further comprises selecting the first current based on the incline. The brake is a parking brake. Determining the incline involves using an output of an inertial measurement unit. Determining the incline involves determining a location where the vehicle is parked, and looking up a recorded grade for the location. Determining the location involves using a global positioning system receiver. The computer-implemented method further comprises determining if the vehicle is electrically plugged in while parked, and in response to the vehicle being electrically plugged in to charge a battery of the vehicle, limiting the first current for static heating. The first current is limited so that there is positive current flowing into the battery.

In a second aspect, a system is configured to perform any of the methods of the first aspect above.

BRIEF DESCRIPTION OF DRAWINGS

Like reference symbols in the various drawings indicate like elements.

DETAILED DESCRIPTION

Figure 1:
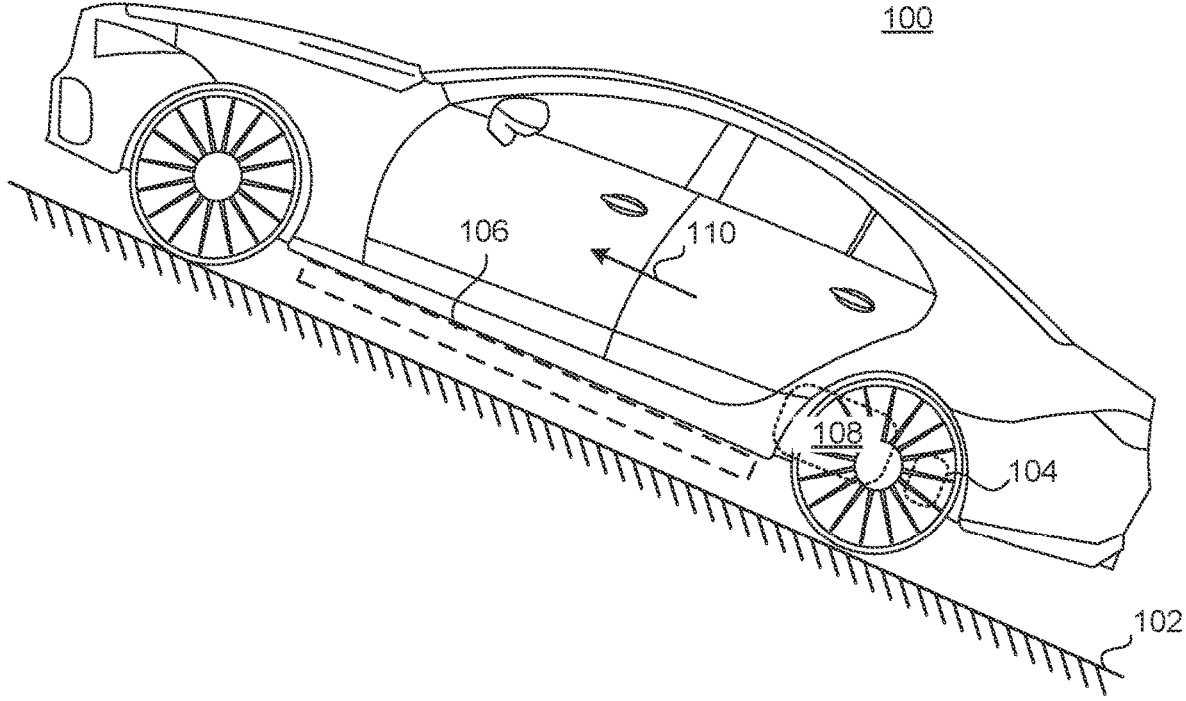
FIG. 1 schematically shows an example of an electric vehicle positioned at an incline.

This document describes examples of systems and techniques for performing static heating of an electric motor based on a vehicle incline. When static heating is performed, it is not intended that the electric motor should produce any torque. However, it is possible that the electric motor inadvertently produces torque during the static heating. A brake (e.g., a parking brake) can therefore be applied during the static heating. Generally, any brake can react up to a maximum amount of torque before slipping or deformation may occur, and this can be referred to as the brake torque limit. If the vehicle is parked at an incline with the brake engaged, this puts a static load on the brake that reduces the amount of inadvertently produced motor torque that can be reacted until the brake torque limit is reached. Depending on the incline, the static heating can therefore be either activated, deactivated, or activated with lower current levels. Processes described herein can be performed by way of one or more computer-implemented methods.

Examples described herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. An EV can be powered exclusively by electricity, or can use one or more other energy sources in addition to electricity, to name just a few examples. As used herein, an EV includes an onboard energy storage, sometimes referred to as a battery pack, to power one or more electric motors. Two or more EVs can have different types of energy storages and/or different sizes thereof.

Examples described herein refer to an electric motor. As used herein, an electric motor can be either a permanent magnet motor, an induction motor, or a synchronous reluctance motor.

Examples described herein refer to static heating. As used herein, static heating involves deliberately operating an electric motor in a way that is designed to not rotate its rotor, that is, with the intention to not produce any torque while powering the electric motor.

Examples described herein refer to an incline. As used herein, an incline is a deviation from a horizontal level. A surface on which an EV may be positioned can constitute an incline. For example, a grade or a slope are examples of inclines. An incline can be numerically quantified using any of multiple known metrics, including, but not limited to, in form of an angle or as a fraction (e.g., in terms of percent). An incline can be positive (upward sloping) or negative (downward sloping). The resulting incline of the vehicle—how much the vehicle's orientation deviates from the horizontal level—can be determined by a sensor.

Examples described herein refer to an inertial measurement unit (IMU). As used herein, an IMU includes, but is not limited to, at least one of an accelerometer, a gyroscope, or a magnetometer.

FIG. 1 schematically shows an example of an EV 100 positioned at an incline 102. A brake 104 (e.g., a parking brake) is here schematically represented and can be applied to at least one wheel to hold the EV 100 stationary while parked at the incline 102. The EV 100 can include at least one battery pack 106, which is here schematically represented. For one or more reasons, static heating of the battery pack 106 using an electric motor 108 can be initiated or scheduled. An incline 110 of the EV 100, here schematically illustrated as an arrow, can be determined using an IMU. In response to the incline 110 being within any of at least one incline range, static heating of the battery pack 106 can be performed. If the determined incline is not within the incline range(s), static heating may not be performed.

Figure 2:
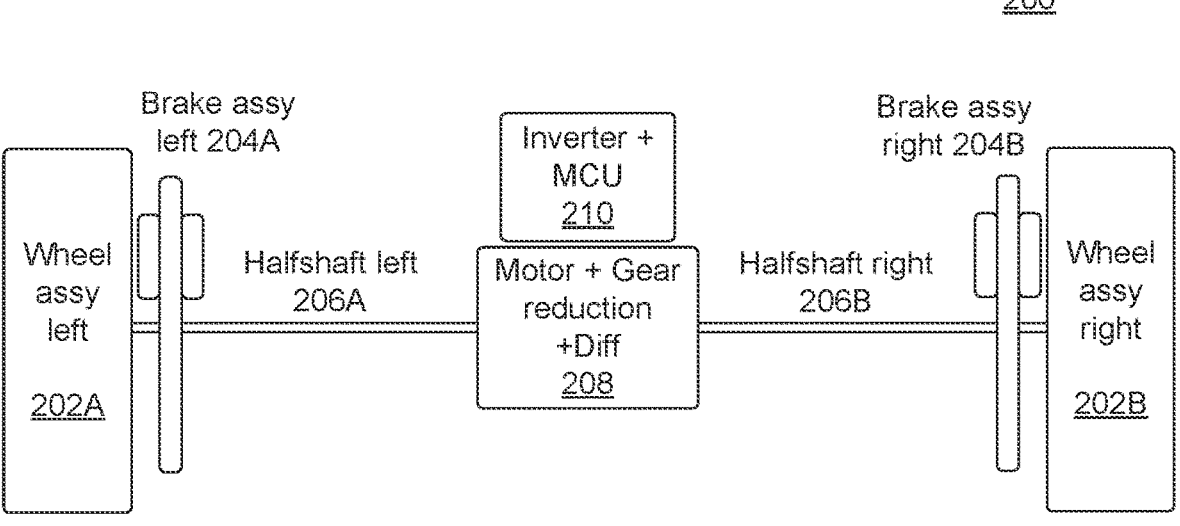
FIG. 2 schematically shows an example of a drivetrain for an EV.

FIG. 2 schematically shows an example of a drivetrain 200 for a vehicle. The drivetrain 200 can be used with one or more other examples described elsewhere herein. The drivetrain 200 includes left and right wheel assemblies 202A-202B, respectively. For example, any of various different types and/or sizes of wheel can be used. While this example shows two drive wheels, in some implementations a vehicle can have more (e.g., four or more) or fewer (i.e., one) drive wheels.

The drivetrain 200 includes left and right brake assemblies 204A-204B, respectively. The left and right brake assemblies 204A-204B can represent the presence of at least two separate braking systems in the vehicle. First, they represent the brakes that are normally applied while the vehicle is moving to reduce the speed or stop the vehicle. This kind of brake can include, but is not limited to, disc brakes and/or drum brakes. For example, this type of brake is sometimes also referred to as a hydraulic brake, and can be engaged at varying degrees with a foot pedal. Second, the left and right brake assemblies 204A-204B represent that the vehicle has a parking brake (sometimes referred to as an emergency brake). This kind of brake can involve, but is not limited to, application of disc brake calipers or a separate drum brake. For example, this type of brake can be automatically applied when the vehicle is in park mode, or can be actuated by hand lever or electronic button, or by a pedal separate from the brake pedal.

The left and right brake assemblies 204A-204B can be associated with one or more brake torque limits. In some implementations, the brake torque limit corresponds to the amount of torque applied to the brake assembly that is expected to cause the brake to slip. For example, the brake torque limit can be reported by the manufacturer of the brake or can be determined by testing.

The drivetrain 200 includes left and right half-shafts 206A-206B, respectively. The left half-shaft 206A provides motor torque to the left wheel assembly 202A by way of a wheel hub, and the right half-shaft 206B provides motor torque to the right wheel assembly 202B by way of another wheel hub.

The drivetrain 200 includes a motor housing 208 that includes an electric motor, and can include a gearbox (e.g., a planetary gear assembly) and a differential (e.g., inside a rotor shaft). The electric motor includes a rotor and a stator. The drivetrain 200 includes electronics 210. For example, the electronics 210 includes an inverter providing electricity to the motor, and a motor control unit (MCU) which can execute software (e.g., firmware) for controlling the inverter. For example, the MCU can include a microprocessor of field-programmable logic array.

Figure 3:
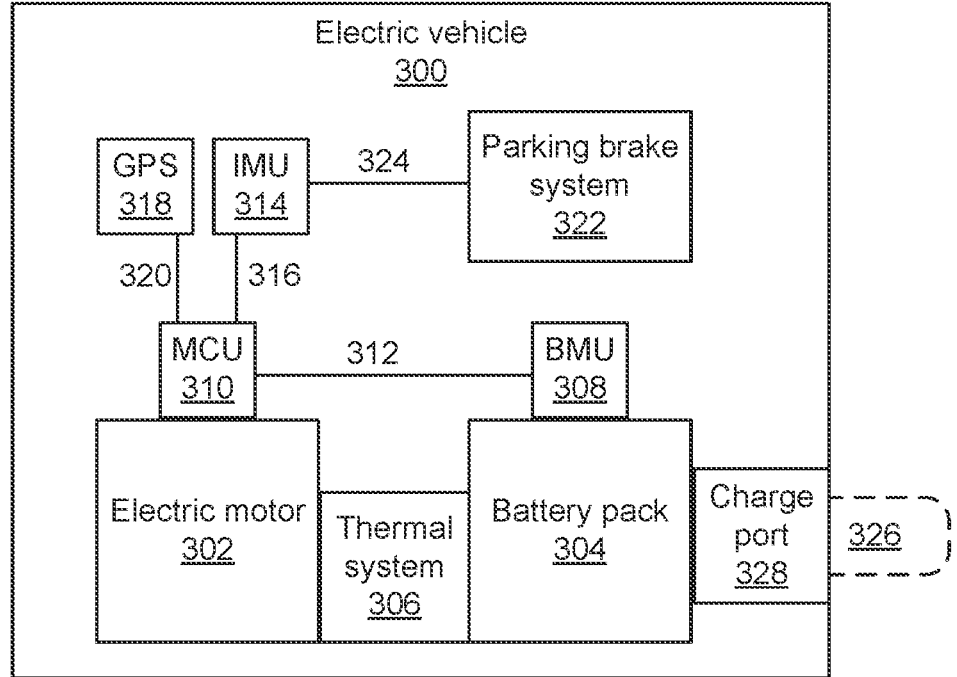
FIG. 3 shows a block diagram of a system to determine an incline for an EV.

FIG. 3 shows a block diagram of a system to determine an incline for an EV 300. The EV 300 here includes an electric motor 302 and a battery pack 304. The electric motor 302 and a battery pack 304 are thermally coupled to each other (and to another system such as a radiator) by at least one thermal system 306. For example, the thermal system 306 can remove heat from either or both of the electric motor 302 and the battery pack 304. As another example, the thermal system 306 can provide heat generated by the electric motor 302 (e.g., during static heating) to the battery pack 304. The battery pack 304 can be controlled by a battery management unit (BMU) 308. For example, the BMU 308 can determine the temperature of the battery pack 304 and whether any heating (or cooling) should be performed.

The electric motor 302 can be controlled by a motor control unit (MCU) 310. The MCU 310 can control the operation of the electric motor 302 during both propulsion and static heating. In some implementations, the MCU 310 can receive a signal 312 from the BMU 308 requesting static heating of the battery pack 304. For example, the MCU 310 can decide whether static heating should be performed, taking into account one or more circumstances relating to the EV 300. As another example, the MCU 310 can decide how to perform such static heating (e.g., the current level(s) to apply, or the duration).

The MCU 310 can take into account an incline in making one or more decisions. The EV 300 can include an IMU 314 that can generate an output indicating an incline of the EV 300. A signal 316 represents that the MCU 310 can obtain the incline of the EV 300 using the IMU 314. If the incline is within any of at least one incline range, the MCU 310 can perform static heating of the battery pack 304 using the electric motor 302.

The MCU 310 can determine the incline of the EV 300 based on location. In some implementations, the EV 300 can include a global positioning system (GPS) receiver 318. The GPS receiver 318 can determine a location where the EV 300 is parked. The EV 300 can look up a recorded grade for that location (e.g., by using a locally stored, or remotely accessible, mapping of surface grades to geographic locations). A signal 320 represents that the MCU 310 can obtain the incline of the EV 300 using the GPS receiver 318.

The MCU 310 can choose the level of current applied to the electric motor 302 based on the incline. For example, a greater current can be applied at a relatively low or zero incline than at a higher incline.

One or more other components in the EV 300 can take an incline into account in at least one operation. The EV 300 can include a parking brake system 322 that can apply a brake to one or more wheels (e.g., a drive wheel, or a non-drive wheel). A signal 324 represents that the parking brake system 322 can obtain the incline of the EV 300 using the IMU 314. The parking brake system 322 can apply different holding force depending on the circumstances. In some implementations, the parking brake system 322 can apply a different clamp force depending on the incline. A greater clamp force can be applied when parked at significant inclines to avoid undue wear of a brake caliper. For example, a standard clamp force can be applied from zero incline up to a first incline, and a higher clamp force can be applied above the first incline.

Static heating can be performed differently depending on the circumstances. In some implementations, it can be determined whether a charge connector 326 (e.g., a charging gun) is plugged into a charge port 328 of the battery pack 304. If so, the current used for the static heating can be limited compared to a level that may be applied when the charge connector 326 is not plugged in. For example, the current can be limited so that there is positive current from the charge connector 326 flowing into the battery pack 304 (e.g., so that the static heating does not cancel out, or significantly offset, the charging).

Figure 4:
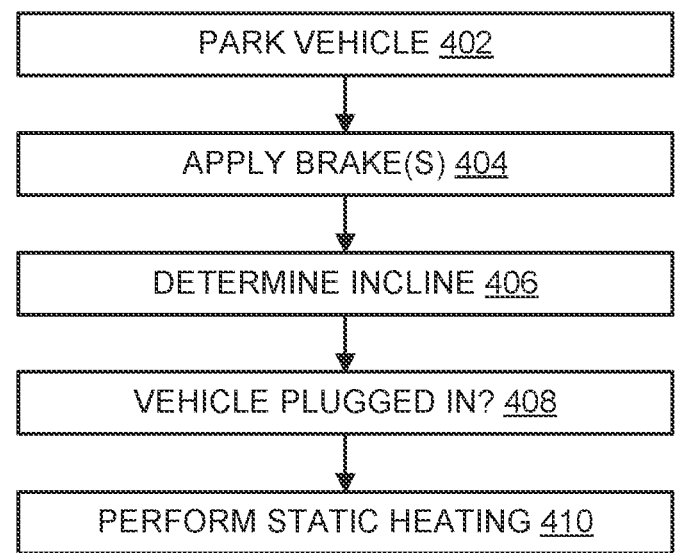
FIG. 4 shows a flowchart of an example of a method.

FIG. 4 shows a flowchart of an example of a method 400. The method 400 can be used with one or more other examples described elsewhere herein. More or fewer operations than shown can be performed. Two or more operations can be performed in a different order unless otherwise indicated.

At operation 402, the EV can be parked. For example, this can be at an indoor or outdoor parking spot or any other location. The location may or may not have an incline.

At operation 404, at least one brake can be applied. In some implementations, the parking brake system 322 (FIG. 3) can apply the brake. For example, the brake(s) can be applied to a drive wheel or to a non-drive wheel.

At operation 406, an incline of the EV can be determined. For example, the IMU 314 and/or the GPS 318 (FIG. 3) can be used.

At operation 408, it can be determined whether the vehicle is plugged in (e.g., when the charge connector 326 is coupled to the charge port 328 (FIG. 3)).

At operation 410, static heating can be performed. If static heating is performed, a standard level of current can be applied, or the current can be selected based on the present incline. By contrast, if the incline is not within any of at least one incline range, static heating may not be performed. The operation 410 can then be omitted.

Figure 5:
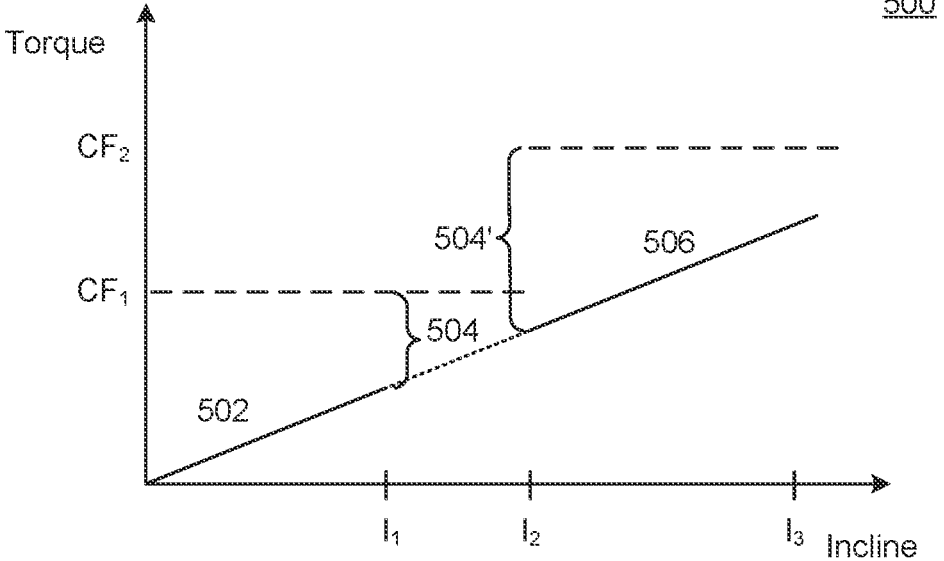
FIG. 5 shows a diagram with examples of incline ranges.

FIG. 5 shows a diagram 500 with examples of incline ranges. The examples illustrate various values of incline where static heating can or cannot be performed. The diagram 500 can be used with one or more other examples described elsewhere herein. In the diagram 500, the horizontal axis shows an incline (e.g., as determined by the IMU 314 and/or the GPS 318 (FIG. 3)). The vertical axis shows torque, both relating to the static load reacted by the brake when parked on an incline, and to the brake torque limit that may depend on a particular applied clamp force.

A first clamp force $CF_1$ can be applied by a parking brake system whenever the EV is parked at an incline in the range from zero to less than an incline ($I_2$). A graph 502 (indicated by a solid line in the diagram 500), indicates the static load reacted by the brake, depending on the incline, at the lowest range of the diagram 500. A margin 504 represents the difference between $CF_1$ and the graph 502 at each point. Assuming for the sake of explanation that the incline here begins to increase from zero, the graph 502 indicates that the margin 504 initially is large enough that an inadvertent torque production is not a concern. As such, static heating can be performed at an interval of low inclines. At some point, however, the margin 504 reaches a predefined limit at which the brake should no longer be subjected to any such inadvertent torque production. Here, that point is indicated as an incline $I_1$. The interval extending from zero incline to $I_1$ can be referred to as a first incline range. As such, static heating can be allowed when the EV is parked at any of the inclines in the first incline range.

A second clamp force $CF_2$ can be applied by the parking brake system whenever the EV is parked at the incline $I_2$ or greater. The second clamp force $CF_2$ is greater than the first clamp force $CF_1$. A graph 506 (indicated by a solid line in the diagram 500), indicates the static load reacted by the brake, depending on the incline, above the incline $I_2$. A margin 504' represents the difference between $CF_2$ and the graph 506 at each point. Beginning at the incline $I_2$ and for some greater inclines thereafter (e.g., up to an incline $I_3$), the margin 504' initially is large enough that an inadvertent torque production is not a concern. As such, static heating can be performed at an interval extending from the incline $I_2$ to the incline $I_3$.

A range in between these intervals, however, can be referred to as a dead zone and is here indicated by a dashed line. In the dead zone, static heating may not be performed because the margin 504 and/or 504' is not sufficiently large.

In short, static heating can be applied as follows:

| Incline range | Static heating |
| --- | --- |
| Zero to incline $I_1$ | Can be performed (e.g., with permissible motor torque as a function of grade) |
| Incline $I_1$ to incline $I_2$ | Can not be performed |
| Incline $I_2$ to incline $I_3$ | Can be performed (e.g., with permissible motor torque as a function of grade) |

In the above example, incline $I_2$ where the second clamp force $CF_2$ begins to apply was used as both the end of the dead zone where static heating is not performed, and as the beginning of the second incline range where static heating can again be performed. However, other end points can be used for the dead zone and the second incline range.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method of performing static heating of an electric motor, the method comprising:
    applying a brake to a wheel of a vehicle that has the electric motor;
    determining an incline of the vehicle; and
    in response to the incline being within a first incline range, providing first current to the electric motor for static heating, the first current selected so as to not produce torque in the electric motor.

2. The computer-implemented method of claim 1, wherein the first incline range extends from zero incline to a first incline value.

3. The computer-implemented method of claim 2, further comprising also providing the first current to the electric motor for static heating in response to the incline being within a second incline range extending from a second incline value to at least a third incline value, the second incline value greater than the first incline value.

4. The computer-implemented method of claim 1, further comprising providing second current to the electric motor for static heating in response to the incline being within a second incline range separate from the first incline range, the second current selected so as to not produce torque in the electric motor.

5. The computer-implemented method of claim 4, wherein the second incline range is greater than the first incline range.

6. The computer-implemented method of claim 4, wherein the second current is different from the first current.

7. The computer-implemented method of claim 4, wherein the brake is applied by a braking system configured to take the incline into account.

8. The computer-implemented method of claim 7, wherein the braking system is configured to apply the brake with a first clamp force up to a first incline, and to apply the brake with a second clamp force greater than the first clamp force above the first incline.

9. The computer-implemented method of claim 8, wherein the first incline is greater than the first incline range.

10. The computer-implemented method of claim 9, wherein the second incline range begins substantially at the first incline.

11. The computer-implemented method of claim 1, further comprising selecting the first current based on the incline.

12. The computer-implemented method of claim 1, wherein the brake is a parking brake.

13. The computer-implemented method of claim 1, wherein determining the incline involves using an output of an inertial measurement unit.

14. The computer-implemented method of claim 1, wherein determining the incline involves determining a location where the vehicle is parked, and looking up a recorded grade for the location.

15. The computer-implemented method of claim 14, wherein determining the location involves using a global positioning system receiver.

16. The computer-implemented method of claim 1, further comprising determining if the vehicle is electrically plugged in while parked, and in response to the vehicle being electrically plugged in to charge a battery of the vehicle, limiting the first current for static heating.

17. The computer-implemented method of claim 16, wherein the first current is limited so that there is positive current flowing into the battery.

18. A system configured to perform the method of claim 1.

* * * * *